United States Patent
Shank et al.

(10) Patent No.: US 10,619,685 B2
(45) Date of Patent: Apr. 14, 2020

(54) PARKING BRAKE SYSTEM

(71) Applicant: UUSI, LLC, Reed City, MI (US)

(72) Inventors: David W. Shank, Hersey, MI (US); John M. Washeleski, Cadillac, MI (US); Gary E. Terrill, LeRoy, MI (US)

(73) Assignee: UUSI, LLC, Reed City, MI (US)

(*) Notice: Subject to any disclaimer, the term of this patent is extended or adjusted under 35 U.S.C. 154(b) by 195 days.

(21) Appl. No.: 14/866,669

(22) Filed: Sep. 25, 2015

(65) Prior Publication Data
US 2016/0091036 A1   Mar. 31, 2016

Related U.S. Application Data

(60) Provisional application No. 62/055,831, filed on Sep. 26, 2014.

(51) Int. Cl.
*F16D 63/00* (2006.01)
*B60T 1/00* (2006.01)

(52) U.S. Cl.
CPC .......... *F16D 63/006* (2013.01); *B60T 1/005* (2013.01)

(58) Field of Classification Search
CPC ........ F16D 2500/31473; F16D 65/563; F16D 63/006; B60T 1/005
See application file for complete search history.

(56) References Cited

U.S. PATENT DOCUMENTS

| | | | |
|---|---|---|---|
| 1,190,811 A * | 7/1916 | Swoyer et al. | F16D 63/006 188/31 |
| 1,833,414 A * | 11/1931 | Cram | F16D 13/64 188/250 R |
| 1,966,308 A * | 7/1934 | Otis | B60T 7/122 188/30 |
| 2,121,869 A * | 6/1938 | Greenawalt | B60T 1/005 188/18 R |
| 3,429,405 A * | 2/1969 | Frigger | F16D 65/18 188/106 R |
| 3,433,332 A * | 3/1969 | Braun | B66D 5/00 188/134 |
| 3,439,551 A * | 4/1969 | Militana | F16H 55/12 474/162 |
| 3,517,783 A * | 6/1970 | Belart | F16D 65/567 188/106 F |
| 3,566,652 A * | 3/1971 | McCardell | B21H 5/027 72/88 |

(Continued)

*Primary Examiner* — Bradley T King
*Assistant Examiner* — James K Hsiao
(74) *Attorney, Agent, or Firm* — Howard & Howard Attorneys PLLC

(57) ABSTRACT

A parking brake system for a vehicle includes a first member adapted to be mounted to a wheel assembly of the vehicle, a spindle shaft block adapted to be mounted to a spindle shaft of the vehicle, a backer plate disposed about a portion of the spindle shaft block, a second member mounted to the backer plate for engagement and disengagement with the first member, and an actuation lever adapted to receive an input to move the first member and the second member into engagement to perform a parking brake function. The parking brake system disclosed requires very little or no force to engage and disengage. The parking brake system has an input for obtaining engage or disengage information from a vehicle operator or from a vehicle independent of the operator. The information will engage the parking brake of the vehicle in a low force and cost effective manner.

22 Claims, 7 Drawing Sheets

(56) References Cited

U.S. PATENT DOCUMENTS

| | | | | |
|---|---|---|---|---|
| 3,739,892 A * | 6/1973 | Liberty, Jr. | ............ | F16D 11/10 192/108 |
| 3,814,222 A * | 6/1974 | Koivunen | ............ | B60K 17/16 188/264 P |
| 3,888,357 A * | 6/1975 | Bauer | ............ | B66C 23/84 212/175 |
| 5,715,916 A * | 2/1998 | Fanelli | ............ | B60T 1/067 188/106 A |
| 5,740,891 A * | 4/1998 | Song | ............ | B60T 1/005 188/250 B |
| 5,984,334 A * | 11/1999 | Dugas | ............ | A61G 5/10 188/109 |
| 6,071,204 A * | 6/2000 | Jefferies | ............ | F16H 55/30 474/161 |
| 6,125,713 A * | 10/2000 | Langlois | ............ | B23P 6/00 29/402.01 |
| 6,125,983 A * | 10/2000 | Reed, Jr. | ............ | B60T 1/005 192/219.4 |
| 6,332,523 B1 * | 12/2001 | Elwood | ............ | B60T 1/062 192/219.6 |
| 6,367,589 B1 * | 4/2002 | Lausch | ............ | B60T 1/005 188/31 |
| 6,378,663 B1 * | 4/2002 | Lee | ............ | A61H 3/04 188/19 |
| 6,637,283 B2 * | 10/2003 | Belloso | ............ | F16H 9/18 474/11 |
| 7,451,865 B2 * | 11/2008 | Eavenson, Sr. | ............ | A01D 34/64 192/219 |
| 7,669,686 B1 * | 3/2010 | Einboeck | ............ | B60T 1/062 180/291 |
| 8,028,597 B2 * | 10/2011 | Cannon | ............ | F16H 3/14 74/355 |
| 8,899,638 B2 * | 12/2014 | Flamm | ............ | E05B 47/026 188/265 |
| 8,973,716 B2 * | 3/2015 | McKay | ............ | B60T 1/04 188/1.12 |
| 2003/0132068 A1 * | 7/2003 | Revelis | ............ | B60T 7/107 188/158 |
| 2003/0159894 A1 * | 8/2003 | Novak | ............ | B60B 27/00 188/72.1 |
| 2012/0291294 A1 * | 11/2012 | Middleton | ............ | B26B 7/00 30/277.4 |
| 2014/0262630 A1 * | 9/2014 | Borshov | ............ | A01D 69/10 188/16 |
| 2015/0226277 A1 * | 8/2015 | Ishiura | ............ | F16D 63/006 188/69 |

* cited by examiner

PARKING BRAKE SYSTEM

CROSS-REFERENCE TO RELATED APPLICATION(S)

The present application claims the benefit of Provisional Patent Application Ser. No. 62/055,831, filed Sep. 26, 2014, the entire disclosure of which is hereby incorporated by reference.

BACKGROUND OF THE INVENTION

1. Field of the Invention

The present invention relates generally to parking brakes for vehicles and, more specifically to a parking brake system that can either manually, semi-automatically, or automatically control a parking brake for a vehicle.

2. Description of the Related Art

It is known to provide a parking brake for a vehicle such as a mowing vehicle. Many present day zero-turn radius mowing vehicles include parking brake systems to ensure that the vehicle is safely parked and cannot roll from a parked position. Current parking brake systems use manual levers or foot pedals to operate the brakes in which some of the systems require the operator to exert substantial force to operate.

It is, therefore, desirable to provide a new parking brake system for a vehicle. It is also desirable to provide a parking brake system for a vehicle that can manually, semi-automatically, or automatically control a parking brake for the vehicle. It is further desirable to provide a parking brake system that can be used for zero-turn radius mowing vehicles to ensure that the vehicle is safely parked and cannot roll from a parked position. Thus, there is a need in the art to provide a parking brake system for a vehicle that meets at least one of these desires.

SUMMARY OF THE INVENTION

Accordingly, the present invention provides a parking brake system for a vehicle including a first member adapted to be mounted to a wheel assembly of the vehicle, a spindle shaft block adapted to be mounted to a spindle shaft of the vehicle, and a backer plate disposed about a portion of the spindle shaft block. The parking brake system also includes a second member mounted to the backer plate for engagement and disengagement with the first member and an actuation lever adapted to receive an input to move the first member and the second member into engagement to perform a parking brake function.

The present invention concerns an apparatus and method for providing a parking brake system for a vehicle that needs zero, or very little activation force from an operator of the vehicle. In one embodiment of the present invention, the parking brake system has components so configured that a parking brake of a vehicle is activated automatically when the vehicle is not in a driven state such as forward or reverse. One embodiment of the parking brake system of the present invention is coupled to a zero turn radius (ZTR) mower so that the mower will have the parking brake applied when a transmission is in a neutral, or non-driven state. This alleviates the operator from having to engage the parking brake when parked or when the operator temporarily gets off of the mower.

One advantage of the present invention is that a new parking brake system is provided for a vehicle. Another advantage of the present invention is that the parking brake system can either manually, semi-automatically, or automatically control a parking brake for the vehicle. Yet another advantage of the present invention is that the parking brake system can be used for zero-turn radius mowing vehicles to ensure that the vehicle is safely parked and cannot roll from a parked position.

Other features and advantages of the present invention will be readily appreciated, as the same becomes better understood, after reading the subsequent description taken in conjunction with the accompanying drawings.

DETAILED DESCRIPTION OF THE PREFERRED EMBODIMENT(S)

Figure 1:
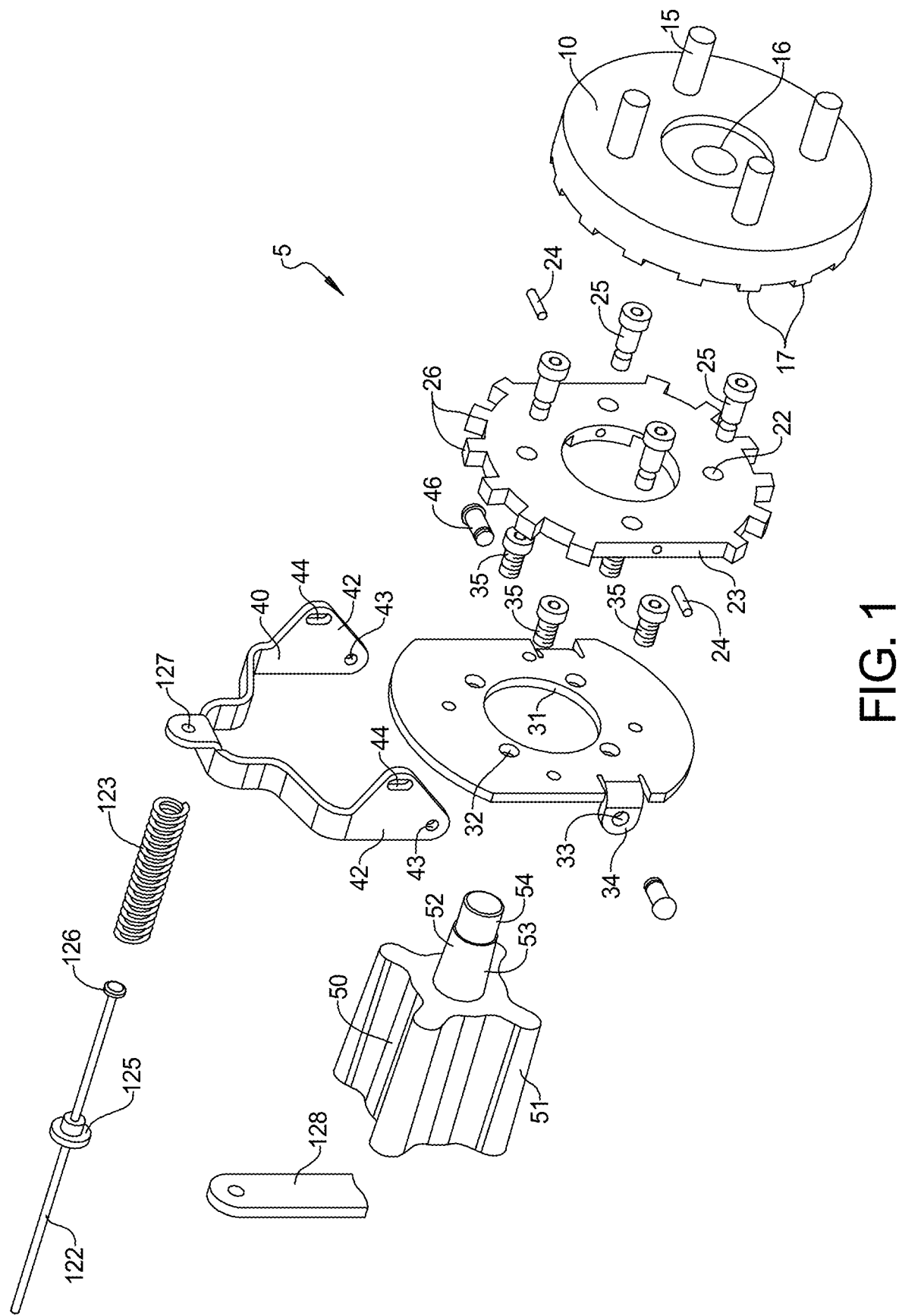
FIG. 1 is an exploded view of one embodiment of a parking brake system, according to the present invention.

Referring to the figures, in particular FIGS. 1 through 6, wherein like numerals indicate like parts throughout the several views, one embodiment of a parking brake system, according to the present invention, is shown generally at 5 for a vehicle (not shown). The parking brake system 5 is for use with a vehicle, specifically a zero turn radius (ZTR) lawn mower. It should be understood that while the present invention can be used specifically on a ZTR lawn mower, it can be used on any wheeled vehicle that lends itself to this application. As illustrated in FIG. 1, one disclosed exemplary embodiment of the parking brake system 5 of the present invention includes a brake hub 10 having wheel mounting lugs 15, brake plate 20, engagement springs 25, backer plate 30, actuation lever 40, and spindle shaft block 50. It should be appreciated that the wheel mounting lugs 15 are mounted to a wheel assembly (not shown) of the vehicle. It should also be appreciated that the spindle shaft block 50 is mounted to a spindle (not shown) of the vehicle.

Figure 2:
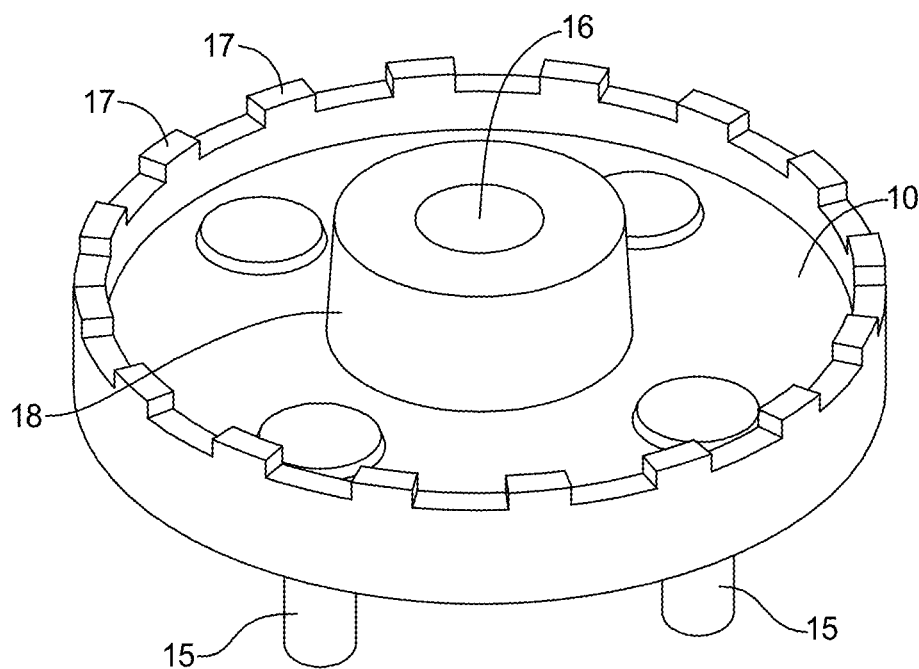
FIG. 2 is a perspective view of a brake hub of the parking brake system of FIG. 1.

FIG. 2 illustrates the brake hub 10 with the wheel mounting lugs 15. The brake hub 10 is generally circular and cylindrical in shape. The wheel mounting lugs 15 are generally circular and cylindrical in shape. The brake hub 10 includes a central aperture 16 extending axially therethrough and the wheel mounting lugs 15 are circumferentially spaced about the central aperture 16 and extend axially from one side of the brake hub 10. The brake hub 10 also includes an outer toothed rim having a plurality of teeth 17 extending axially from a side of the brake hub 10 opposite the side that the wheel mounting lugs 15 extend. The brake hub 10 further includes a projection 18 extending axially from the side with the teeth 17. The projection 18 is generally circular and cylindrical in shape. The projection 18 is tapered and centrally located. The brake hub 10 is made of a rigid material. It should be appreciated that the central aperture 16 extends axially through the projection 18.

Figure 3:
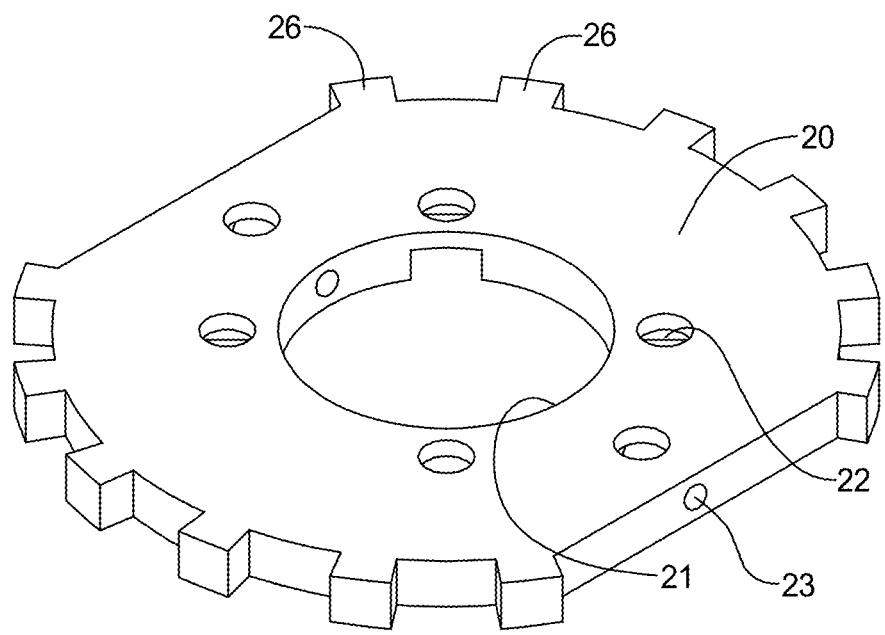
FIG. 3 is a perspective view of a brake plate of the parking brake system of FIG. 1.

FIG. 3 illustrates the brake plate 20 of a locking toothed type. The brake plate 20 is generally planar with planar sides and arcuate ends. The brake plate 20 includes a central aperture 21 extending axially therethrough. The central aperture 21 is generally circular in shape to receive the projection 18 of the brake hub 10. The brake plate 20 also includes one or more apertures 22 spaced about the central aperture 21 and extending axially therethrough. The apertures 22 have a diameter less than a diameter of the central aperture 21. Some of the apertures 22 are for receiving the engagement springs 25. The engagement springs 25 are of a fastener pin type to engage the apertures 22. The brake plate 20 includes a side aperture 23 extending radially into each of the planar sides. The side apertures 23 are generally circular in shape for receiving a circular pin 24. The pin 24 is generally cylindrical in shape. The brake plate 20 further includes a plurality of outer edge teeth 26 extending radially from and spaced circumferentially along the arcuate ends. The brake plate 20 is made of rigid material. It should be appreciated that the teeth 26 of the brake plate 20 engage and disengage spaces or notches between the teeth 17 of the brake hub 10. It should be appreciated that the engagement springs 25 have a compressible portion and are disposed between the brake plate 20 and brake hub 10 to axially separate them in a disengaged condition.

Figure 4:
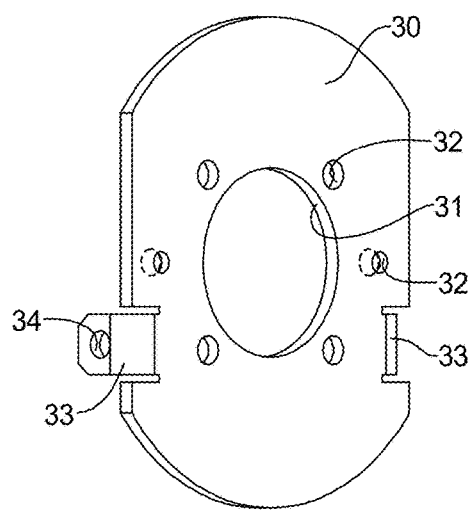
FIG. 4 is a perspective view of a backer plate of the parking brake system of FIG. 1.

FIG. 4 illustrates the backer plate 30 for attaching the components of the actuation lever 40, brake plate 20, and engagement spring pins 25 to the spindle shaft block 50. The backer plate 30 is generally planar with planar sides and arcuate ends. The backer plate 30 includes a central aperture 31 extending axially therethrough. The central aperture 31 is generally circular in shape to receive the projection 18 of the brake hub 10. The backer plate 30 includes one or more apertures 32 spaced about the central aperture 31 and extending axially therethrough. The apertures 32 have a diameter less than a diameter of the central aperture 31. Some of the apertures 32 are for receiving the engagement springs 25. The engagement springs 25 are of a fastener pin type to engage the apertures 32. The backer plate 30 also includes a side tabs 33 extending axially from each of the sides. Each side tab 33 includes an aperture 34 extending therethrough that is generally circular in shape for receiving a fastener 46 to be described. The backer plate 30 is made of rigid material. The parking brake system 5 also includes one or more fasteners 35 for attaching the brake plate 20 to the backer plate 30. The fasteners 35 engage some of the apertures 22 and 32 in the brake plate 20 and backer plate 30, respectively. It should be appreciated that the embodiment of the parking brake system 5 illustrated in FIG. 1 is not intended to limit the scope of the present invention. It should also be appreciated that the parking brake system 5 may be used with various other types of vehicles, not specifically shown herein, without departing from the scope of the present invention.

Referring to FIG. 1, the actuation lever 40 has a generally inverted "U" shape. The actuation lever 40 has a base portion 41 and side portions 42 extending from the base portion 41. The side portions 42 are generally triangular in shape. Each side portion 42 includes a circular aperture 43 near a lower corner thereof and an elongated aperture 44 near an upper corner thereof. The elongated aperture 44 receives the pin 24. The parking brake system 5 also includes a fastener 46 extending through the circular aperture 43 and into the aperture 34 for attaching the actuation lever 40 to the backer plate 30. The actuation lever 40 is made of rigid material. It should be appreciated that the actuation lever 40 pivots or rotates about the fastener 46.

The spindle shaft block 50 includes a block portion 51 and a shaft portion 52 extending axially from one end of the block portion 51. The shaft portion 52 is generally circular and cylindrical in shape. The shaft portion 52 has a first portion 53 that is tapered and is received in the central aperture 16 of the projection 18 and a second portion 54 that has a diameter less than a diameter of the first portion 53 that extends through the central aperture 16 past the side of the brake hub 10 from which the wheel mounting lugs 15 extend. The spindle shaft block 50 is made of a rigid material. It should be appreciated that the block portion 51 is conventional and engages a portion (not shown) of the vehicle.

Figure 5:
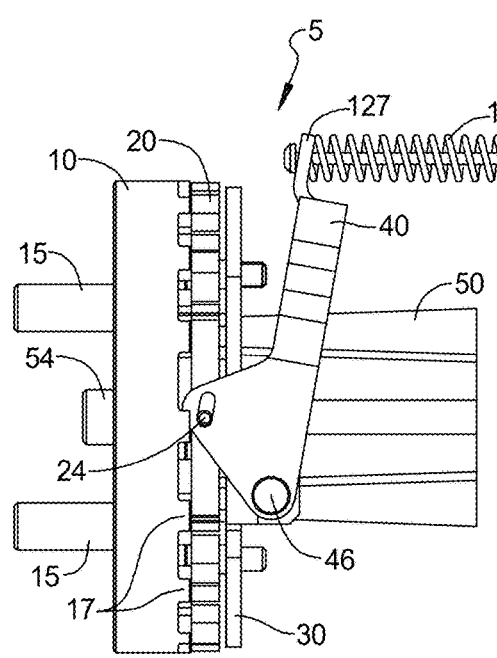
FIG. 5 is an elevational view of the parking brake system of FIG. 1 illustrating the parking brake system in a disengaged position.
Figure 6:
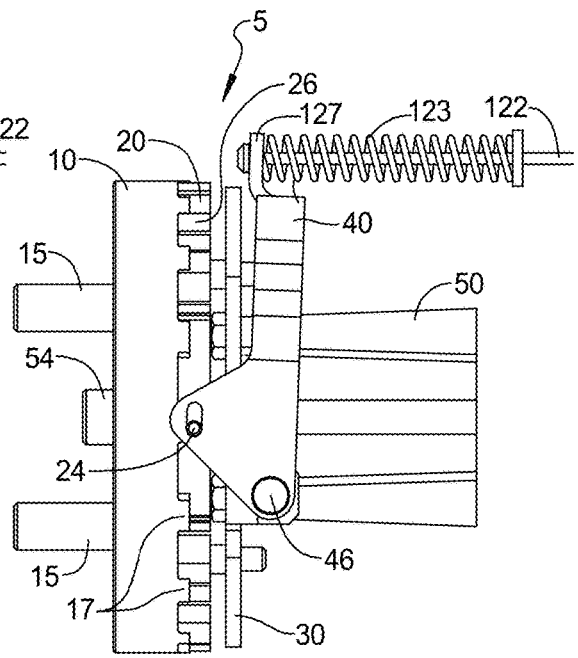
FIG. 6 is an elevational view of the parking brake system of FIG. 1 illustrating the parking brake system in an engaged position.

FIGS. 5 and 6 illustrate the parking brake system 5 in the disengaged and engaged positions, respectively. When the actuation lever 40 is moved or pulled away from the backer plate 30, the brake plate 20 is moved or pulled away from the brake hub 10, thereby disengaging the teeth 17 and 26 from each other as illustrated in FIG. 5. This allows the brake hub 10 with the wheel mounting lugs 15 to freely rotate as driven by a spindle shaft (not shown) held in the spindle shaft block 50. When the actuation lever 40 is moved or pushed toward the backer plate 30, the brake plate 20 is moved or pushed toward the brake hub 10, thereby engaging the teeth 26 of the brake plate 20 and the teeth 17 of the brake hub 10 in an interdigitated fashion. The teeth 17 on the brake hub 10 and the teeth 26 on the brake plate 20 are such that they engage at an approximate angle of ten (10) degrees. It should be appreciated that angles less than ten (10) degrees may not allow the teeth 17 of the brake hub 10 to ride over the teeth 26 of brake plate 20. It should also be appreciated that a 10 degree angle will allow for disengagement of the two components with less force. By changing the engagement angles of the teeth on the hub and brake plate, the forces to disengage can be increased or decreased. Likewise the holding force to keep the brake plate engaged can be increased or reduced. The optimal design reduces the hold force to its lowest while not increasing the pull out forces. By optimizing the angles of the engaging teeth, the brake assembly of FIG. 1 can be manually or power actuated by a linear or rotary solenoid or by a motor drive, by applying push and pull force to rod 100 or 40.

In the event that the teeth 17 of the brake hub 10 and the teeth 26 of the brake plate 20 are such that they are moved or pressed down on each other in an interference condition not allowing for interdigitation, the engagement springs 25 or 123 will have their spring portions compressed in anticipation of the interference condition being eliminated. When the wheel assembly rotates slightly and the teeth 17 and 26 are no longer in an interference condition, the compressed engagement springs 25 will push the teeth 26 of brake plate 20 into the spaces or notches between the teeth 17 of the brake hub 10, thereby locking the two assemblies together to perform the parking brake function. Spring 25 or 123 must provide the brake plate with holding force one the teeth are aligned. Rod 122 when pushed moves brake plate 20 toward hub 10, moves toward the fully engaged position if the teeth are not aligned there is high force on spring 123 as spring plate 125 applies pressure to spring 123. As rod 122 moves to its fully engaged position it will sit in this state until the teeth of the brake plate align with the teeth of the hub. The travel spring 123 must no apply the holding force to prevent the rotation force from disengaging the brake. Likewise if the hub is powered and forces exceed the spring rate, the brake plate will index by compressing spring 123 against rod 122 spring retainer and disengage the brake.

Actuation of the actuation lever 40 is accomplished by receiving an input through a manual lever or foot pedal mechanism (not shown) from an operator of the vehicle. The exemplary parking brake system 5 uses an electromechanical device (not shown) such as a motor or solenoid that is operated either by the operator by the depression of a switch or the automatic engagement of the motor or solenoid if the operator dismounts from the vehicle, thereby changing states of a seat switch, or by the drive engagement levers being placed in the neutral position or in a park position.

Figure 9:
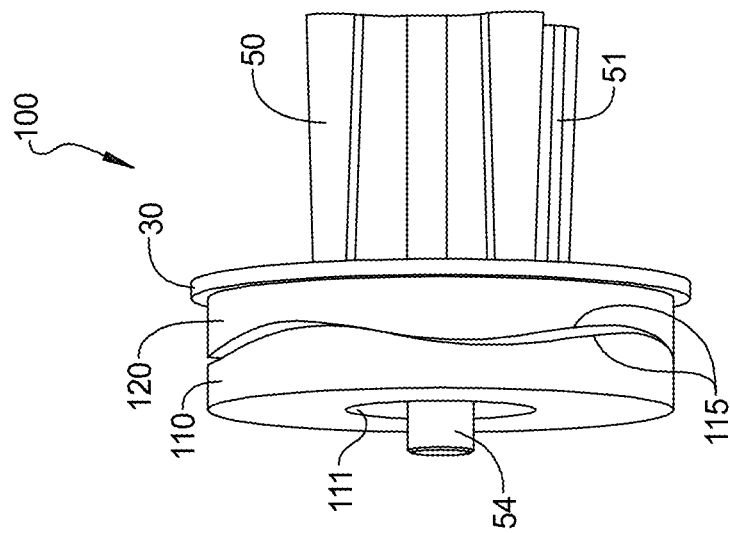
FIG. 9 is a perspective view of the parking brake system of FIG. 7 illustrating the system in an engaged position shown with one disk riding up on a ramp contour of an opposing disk.
Figure 8:
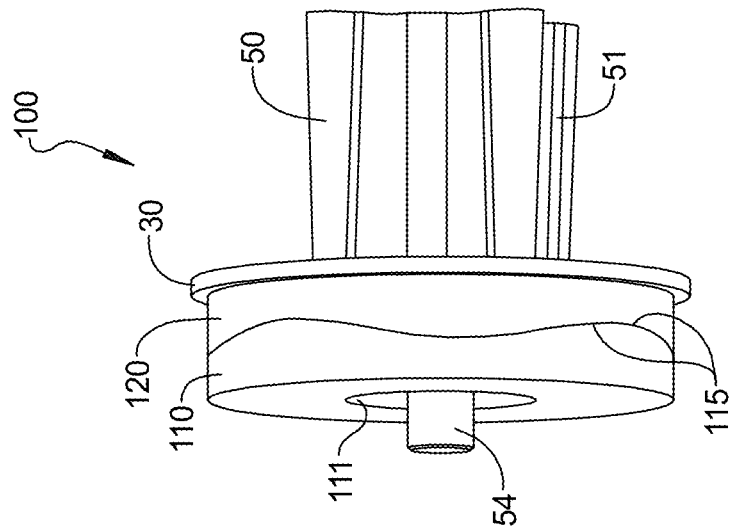
FIG. 8 is a perspective view of the parking brake system of FIG. 7 illustrating the system in an engaged position.
Figure 7:
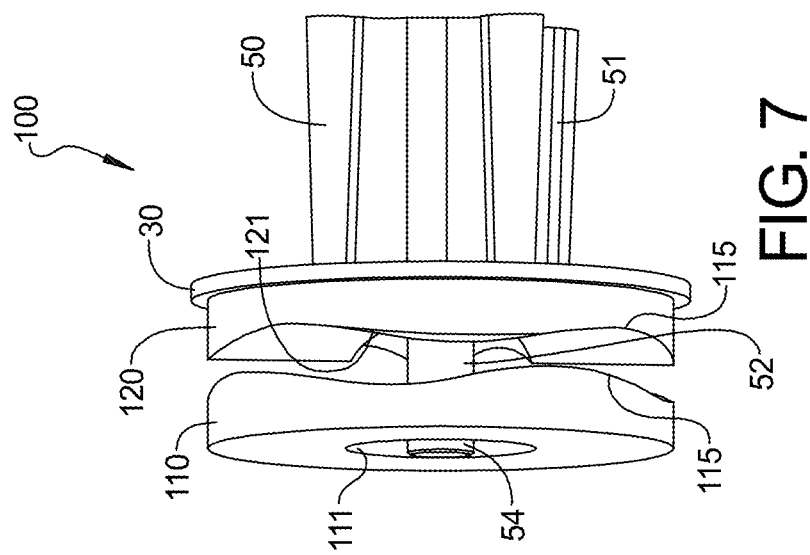
FIG. 7 is a perspective view of another embodiment, according to the present invention, for the parking brake system of FIG. 1 and is of a waved friction plate type, illustrating the system in a disengaged position.

Referring to FIGS. 7 through 9, another embodiment, according to the present invention, of the parking brake system is shown at 100. The parking brake system 100 uses waved contour disks instead of toothed plates and hubs. As illustrated in FIGS. 7, 8, and 9, the parking brake system 100 uses two interlocking waved contour disks 110 and 120 to provide braking force in the parking brake of a zero turn radius mower vehicle. FIG. 7 illustrates the disks 110 and 120 separated by a distance such that the two disks 110 and 120 do not come in contact with each other in a disengaged condition. FIG. 8 illustrates the two disks 110 and 120 engaged with each other in an engaged condition, providing a high surface contact area.

Referring to FIGS. 7 and 8, the first disk 110 is generally circular in shape and has a planar side. The first disk 110 includes a central aperture 111 extending axially therethrough to receive the shaft portion 52 of the spindle shaft block 50. The second portion 54 of the shaft portion 52 extends past a planer side of the first disk 110. It should be appreciated that the first disk 110 also includes one or more wheel mounting lugs (not shown) extending from the planer side for mounting to a wheel assembly (not shown) of the vehicle.

The first disk 110 also includes one or more ramps or ramp contours 115 extending radially and circumferentially along a side opposite the planer side. The ramp contours 115 are generally wave shaped similar to a wave with peaks and valleys. The first disk 110 may include a central projection (not shown) extending axially and centrally located on the side opposite the planar side. The first disk 110 is made of a rigid material. It should be appreciated that the first disk includes a plurality of apertures (not shown) to receive the engagement springs (not shown).

The second disk 120 is generally circular in shape and has a planar side. The second disk 120 includes a central aperture 121 extending axially therethrough to receive the shaft portion 52 of the spindle shaft block 50. The second disk 120 has a plurality of apertures (not shown) for receiving the engagement springs (not shown). The second disk 120 is mounted to the backer plate 30. It should be appreciated that the backer plate 30 attaches the components of the actuation lever (not shown), second disk 120, and engagement springs (not shown) to the spindle shaft block 50.

The second disk 120 also includes one or more ramps or ramp contours 115 extending radially and circumferentially along a side opposite the planer side. The ramp contours 115 are generally wave shaped similar to a wave with peaks and valleys. The ramp contours 115 of the first disk 110 and the second disk 120 may mate and engage each other in an engaged condition as illustrated in FIG. 8. The second disk 110 is made of a rigid material. It should be appreciated that the backer plate 30, which is actuated by the actuation lever (not shown), moves the second disk 120 into engagement with the first disk 110.

FIG. 9 illustrates that, if the wheel assembly of the vehicle tries to turn, the first disk 110 that is rigidly mounted to it also tries to turn and begins to travel up ramp contours 115 of the second disk 120. This rotation causing the first disk 110 to ride up a curved surface or ramp contour 115 of the second disk 120 adds considerable force resisting the rotation. As the first disk 110 rides up on the ramp contours 115 of the second disk 120, the engagement springs are compressed, adding even further force to the disks 110 and 120 to resist rotation of the wheel assembly.

Figure 10:
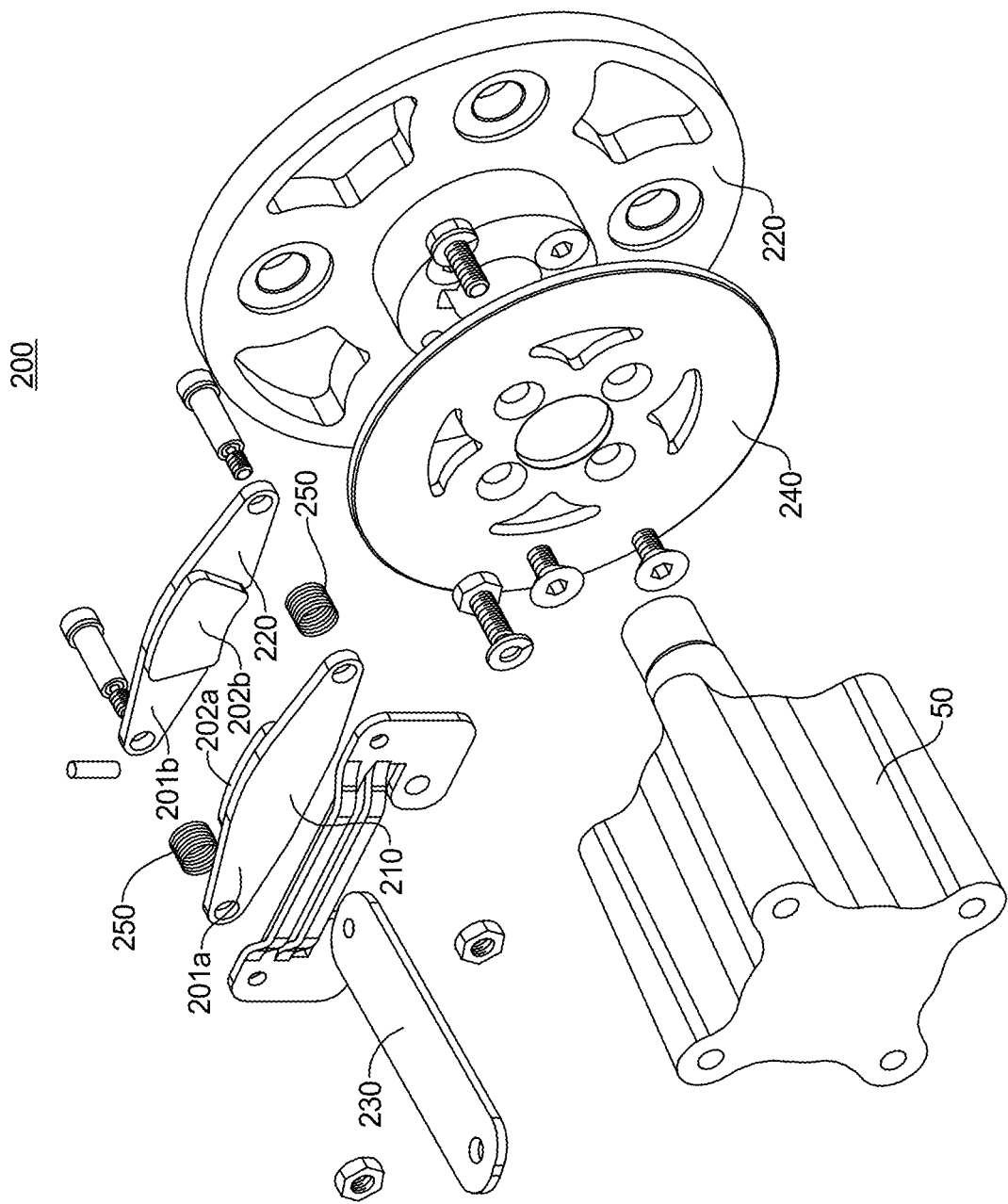
FIG. 10 is an exploded view of yet another embodiment of a parking brake system, according to the present invention.

Referring to FIG. 10, yet another embodiment, according to the present invention, of the parking brake system is shown at 200. In this embodiment, the parking brake system 200 includes mainly a disk 240 affixed to a hub 260, two disk pad assemblies 210 and 220, and an actuation lever 230. The disk pad assemblies 210 and 220 include backing plates 201*a* and 201*b*, and brake pads 202*a* and 202*b*, respectively. The disk pad assembly 220 is at a fixed location in relationship to the disk 240 and is in close proximity of one side of the disk 240 such that the brake pad 202*b* is parallel to the disk 240. If the lever 230 of the parking brake system 10 is rotated from its nominal perpendicular relationship with the disk 240, the disk pad assembly 210 will travel inward compressing springs 250 and will make contact with the disk 240. The disk 240 will warp under the pressure of the disk pad assembly 210 such that the opposing side of the disk 240 will come in contact with the disk pad assembly 220. The result of the actuation force developed will cause a resistance to wheel rotation and will with enough force cause the disk 240 to stop rotating and lock in position. When the lever 230 is again released so that it travels back to its nominal position, springs 250 relax and push the disk pad assembly 210 away from the disk 240 allowing for its free rotation.

Figure 11:
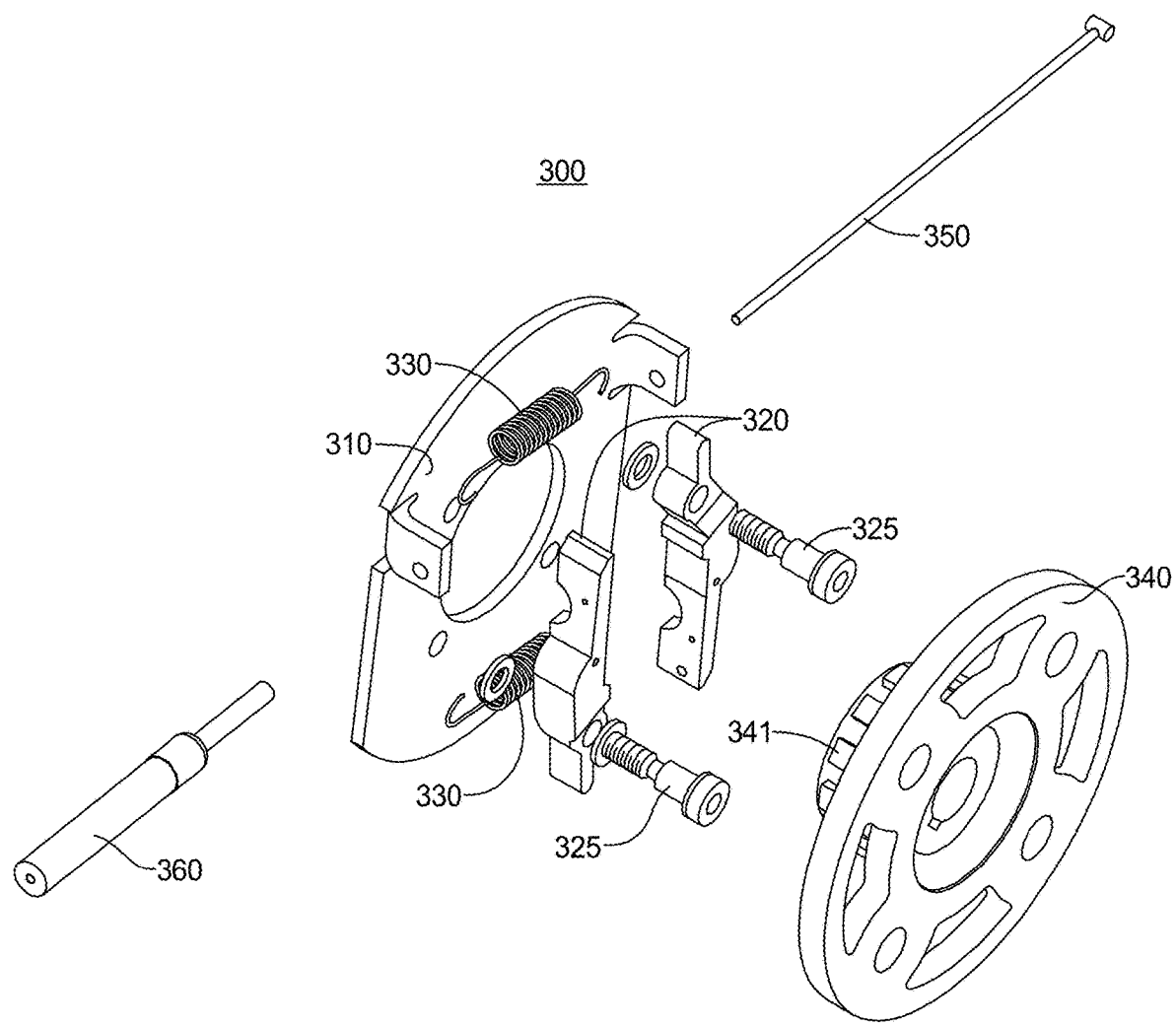
FIG. 11 is an exploded view of still another embodiment of a parking brake system, according to the present invention.
Figure 12:
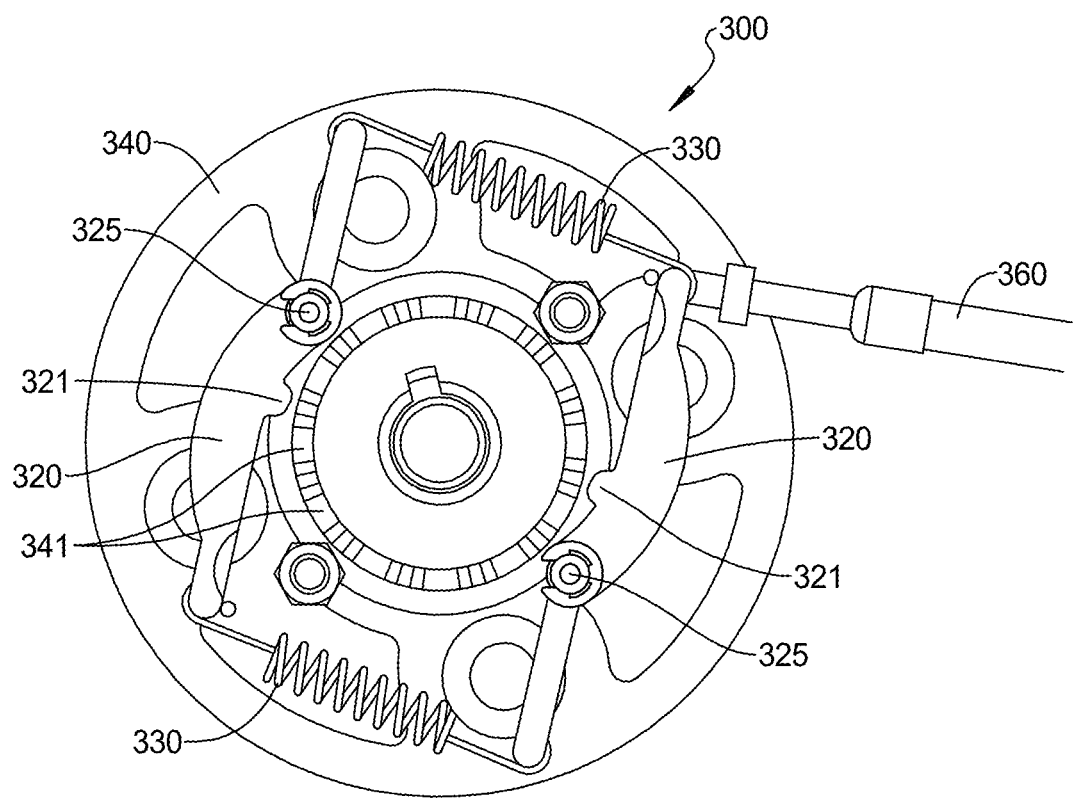
FIG. 12 is an elevational view of the parking brake system of FIG. 11 illustrating the system in a brake disengaged position.
Figure 13:
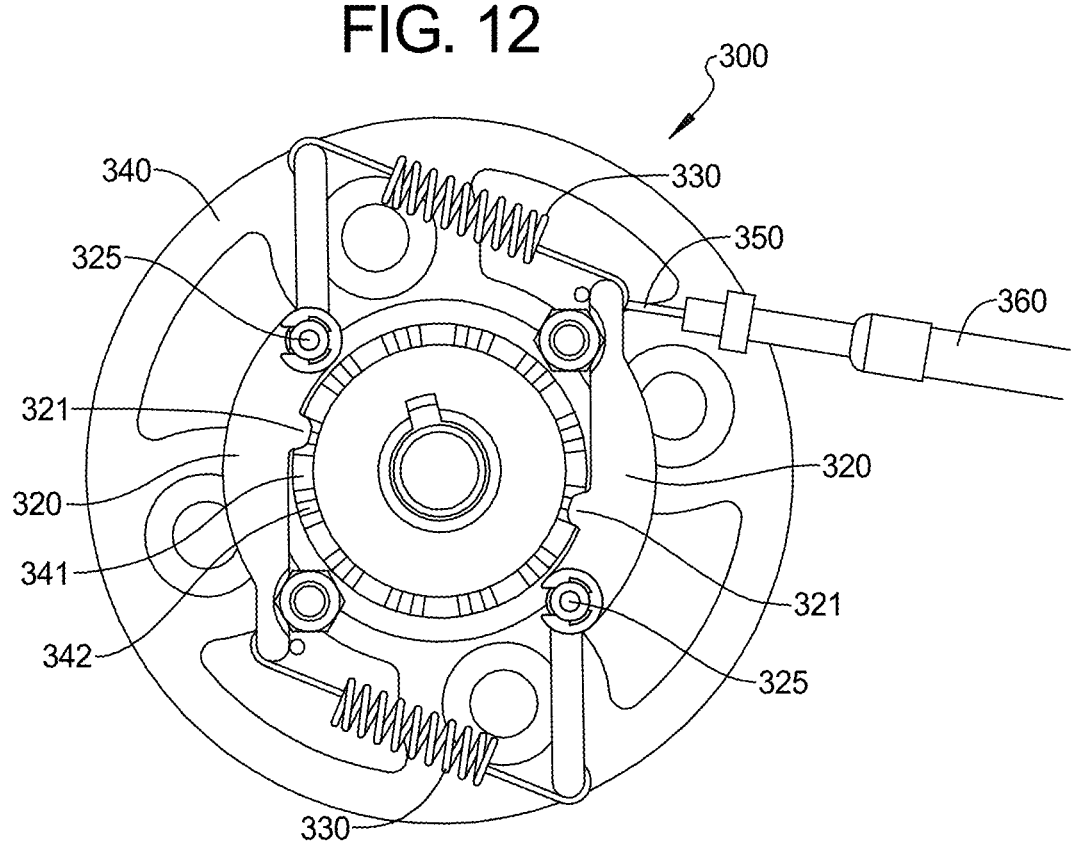
FIG. 13 is an elevational view of the parking brake system of FIG. 11 illustrating the system in a brake engaged position.

Referring to FIGS. 11, 12, and 13, still another embodiment, according to the present invention, of the parking brake system is shown at 300. In this embodiment, the parking brake system 300 includes a hub 340 with a central, concentric, and evenly distributed ring of teeth 341 interdigitated with spaces 342, two pawls 320, two springs 330, and an actuation linkage 360. The pawls 320 are linked together by the springs 330 and each pivot around respective fixed shafts 325. The pawls 320 include teeth 321. The actuation linkage 360 pulls or pushes on one of the pawls 320 to rotate the pawl 320 about its shaft 325. As one pawl 320 changes position, the springs 330 effect positional change in the other pawl 320. The pawl position as illustrated in FIG. 12 allows for the hub 340 to rotate freely. FIG. 13 illustrates that, as each of the pawl teeth 321 closes in on the teeth 341 of the hub 340, they are disposed to engage in between the teeth 341 into the spaces 342 and lock rotation of the hub 340. In the event that when an actuation cable 350 of the actuation linkage 360 attempts to push the pawls 320 into the locked rotation position and the pawl teeth 321 coincide with the teeth 341 of the hub 340 preventing engagement, the hub 340 will continue to rotate until such time that the spaces 342 coincide with the pawl teeth 321 at which time the pawl teeth 321 will engage into the spaces 342 of the teeth 341 of the hub 340, locking rotation of the hub 340.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A parking brake system for a vehicle comprising:
a first member adapted to be mounted to a wheel assembly of the vehicle, said first member having a first side including at least one wheel mounting lug extending therefrom and adapted to be mounted to a wheel assembly of the vehicle and a second side opposite said first side;
a spindle shaft block adapted to be mounted to a spindle shaft of the vehicle, said spindle shaft block having a block portion and a shaft portion extending axially from one end of said block portion;
a backer plate disposed about said shaft portion of said spindle shaft block, said backer plate having a first side and a second side opposite said first side, said block portion extending away from said second side of said backer plate and said second side of said first member;
a second member separate from and attached axially to said backer plate for axial engagement and disengagement with said first member, said second member being disposed between said second side of said first member and said first side of said backer plate; and
a rotatable actuation lever pivotally connected to said backer plate and adapted to receive an input to pivot on said backer plate such that said first member and said second member move axially into axial engagement to perform a parking brake function.

2. A parking brake system as set forth in claim 1 wherein said first member comprises a brake hub having a plurality of first teeth extending axially.

3. A parking brake system as set forth in claim 2 wherein said second member comprises a brake plate having a plurality of second teeth extending radially for mating with said first teeth in an engaged condition.

4. A parking brake system as set forth in claim 3 wherein said first teeth and said second teeth have a non-self-locking angle.

5. A parking brake system as set forth in claim 3 wherein said first teeth and said second teeth have a self-locking angle, that when engaged, will not allow said first teeth of said brake hub to ride over said second teeth of said brake plate.

6. A parking brake system as set forth in claim 5 wherein said second member comprises a second disk having a plurality of second ramp contours for mating with said first ramp contours in an engaged condition.

7. A parking brake system as set forth in claim 6 wherein said actuation lever has a plurality of elongated apertures extending therethrough, one of said apertures receiving one of said pins.

8. A parking brake system as set forth in claim 1 wherein said first member comprises a first disk having a plurality of first ramp contours.

9. A parking brake system as set forth in claim 1 including a plurality of engagement springs disposed between said first member and said second member to separate said first member and said second member in a disengaged condition.

10. A parking brake system as set forth in claim 9 including a plurality of fasteners to pivotally attach said actuation lever to said backer plate.

11. A parking brake system as set forth in claim 1 including a plurality of pins attached to said second member.

12. A parking brake system as set forth in claim 1 wherein said first member includes a plurality of wheel mounting lugs extending axially from one side thereof.

13. A parking brake system as set forth in claim 1 wherein said first member includes a central aperture to receive a shaft portion of said spindle shaft block.

14. A parking brake system as set forth in claim 1 wherein said spindle shaft block has a block portion and a shaft portion extending axially from said block portion.

15. A parking brake system as set forth in claim 14 wherein said shaft portion has a tapered first portion and a second portion having a diameter less than a diameter of said first portion.

16. A parking brake system as set forth in claim 1 wherein said backer plate has a central first aperture extending axially therethrough to receive the shaft portion of said spindle shaft block.

17. A parking brake system for a vehicle comprising:
a first member adapted to be mounted to a wheel assembly of the vehicle;
a spindle shaft block adapted to be mounted to a spindle shaft of the vehicle;
a backer plate disposed about a portion of said spindle shaft block;
a second member mounted to said backer plate for axial engagement and disengagement with said first member;
a rotatable actuation lever pivotally connected to said backer plate and adapted to receive an input to pivot on said backer plate such that said first member and said second member move axially into axial engagement to perform a parking brake function;
wherein said first member comprises a brake hub having a plurality of first teeth, said second member comprises a brake plate having a plurality of second teeth for mating with said first teeth in an engaged condition, and said first teeth and said second teeth have a non-self-locking angle; and
wherein said non-self-locking angle is an angle of approximately ten (10) degrees.

18. A parking brake system for a vehicle comprising:
a first member adapted to be mounted to a wheel assembly of the vehicle;
a spindle shaft block adapted to be mounted to a spindle shaft of the vehicle;
a backer plate disposed about a portion of said spindle shaft block;
a second member mounted to said backer plate for axial engagement and disengagement with said first member;
a rotatable actuation lever pivotally connected to said backer plate and adapted to receive an input to pivot on said backer plate such that said first member and said second member move axially into axial engagement to perform a parking brake function;

wherein said first member comprises a brake hub having a plurality of first teeth, said second member comprises a brake plate having a plurality of second teeth for mating with said first teeth in an engaged condition, and said first teeth and said second teeth have a self-locking angle, that when engaged, will not allow said first teeth of said brake hub to ride over said second teeth of said brake plate; and wherein said self-locking angle is an angle of approximately seven (7) degrees.

19. A parking brake system for a vehicle comprising:

a first member adapted to be mounted to a wheel assembly of the vehicle;

a spindle shaft block adapted to be mounted to a spindle shaft of the vehicle;

a backer plate disposed about a portion of said spindle shaft block;

a second member mounted to said backer plate for axial engagement and disengagement with said first member;

a rotatable actuation lever pivotally connected to said backer plate and adapted to receive an input to pivot on said backer plate such that said first member and said second member move axially into axial engagement to perform a parking brake function;

wherein said first member includes a central aperture to receive a shaft portion of said spindle shaft block; and wherein said backer plate includes a plurality of second apertures extending axially therethrough, said second apertures having a diameter less than a diameter of said first aperture to receive engagement springs.

20. A parking brake system for a vehicle comprising:

a first member adapted to be mounted to a wheel assembly of the vehicle;

a spindle shaft block adapted to be mounted to a spindle shaft of the vehicle;

a backer plate disposed about a portion of said spindle shaft block;

a second member mounted to said backer plate for axial engagement and disengagement with said first member;

a rotatable actuation lever pivotally connected to said backer plate and adapted to receive an input to pivot on said backer plate such that said first member and said second member move axially into axial engagement to perform a parking brake function; and wherein said backer plate has a plurality of said side tabs extending therefrom, each of said side tabs having an aperture extending therethrough.

21. A parking brake system for a mowing vehicle comprising:

a brake hub having a first side including at least one wheel mounting lug extending therefrom and adapted to be mounted to a wheel assembly of the mowing vehicle, said hub having a second side opposite said first side including plurality of first teeth extending axially and spaced circumferentially, said hub having a central aperture extending axially therethrough;

a spindle shaft block adapted to be mounted to a spindle shaft of the mowing vehicle, said spindle shaft block having a block portion and a shaft portion extending axially from one end of said block portion and received in said central aperture;

a backer plate disposed about said shaft portion of said spindle shaft block, said backer plate having a first side and a second side opposite said first side, said block portion extending away from said second side of said backer plate and said second side of said brake hub;

a brake plate separate from and attached to said backer plate for axial engagement and disengagement with said brake hub, said brake plate being disposed between said second side of said brake hub and said first side of said backer plate, said brake plate having a plurality of second teeth extending radially and spaced circumferentially for mating with said first teeth in an engaged condition; and a rotatable actuation lever pivotally connected to said backer plate and adapted to receive an input to pivot on said backer plate such that said brake plate moves axially into axial engagement with said brake hub to perform a parking brake function.

22. A parking brake system for a mowing vehicle comprising:

a first disk having a first side including at least one wheel mounting lug extending therefrom and adapted to be mounted to a wheel assembly of the mowing vehicle, said first disk having a second side opposite the first side including a plurality of first ramp contours;

a spindle shaft block adapted to be mounted to a spindle shaft of the mowing vehicle, said spindle shaft block having a block portion and a shaft portion extending axially from one end of said block portion;

a backer plate disposed about said shaft portion of said spindle shaft block, said backer plate having a first side and a second side opposite said first side, said block portion extending away from said second side of said backer plate and said second side of said first disk;

a second disk separate from and attached axially to said backer plate for engagement and disengagement with said first disk, said second disk being disposed between said second side of said first disk and said first side of said backer plate, said second disk having a plurality of second ramp contours for mating with said first ramp contours in an engaged condition; and an actuation lever pivotally connected to said backer plate and adapted to receive an input to pivot on said backer plate such that said second disk moves into axial engagement with said first disk to perform a parking brake function.

* * * * *